May 23, 1961    J. C. RUSSELL    2,984,939
METHOD AND APPARATUS FOR DISPENSING LIQUID FROM PRESSURE CANS
Filed April 22, 1959
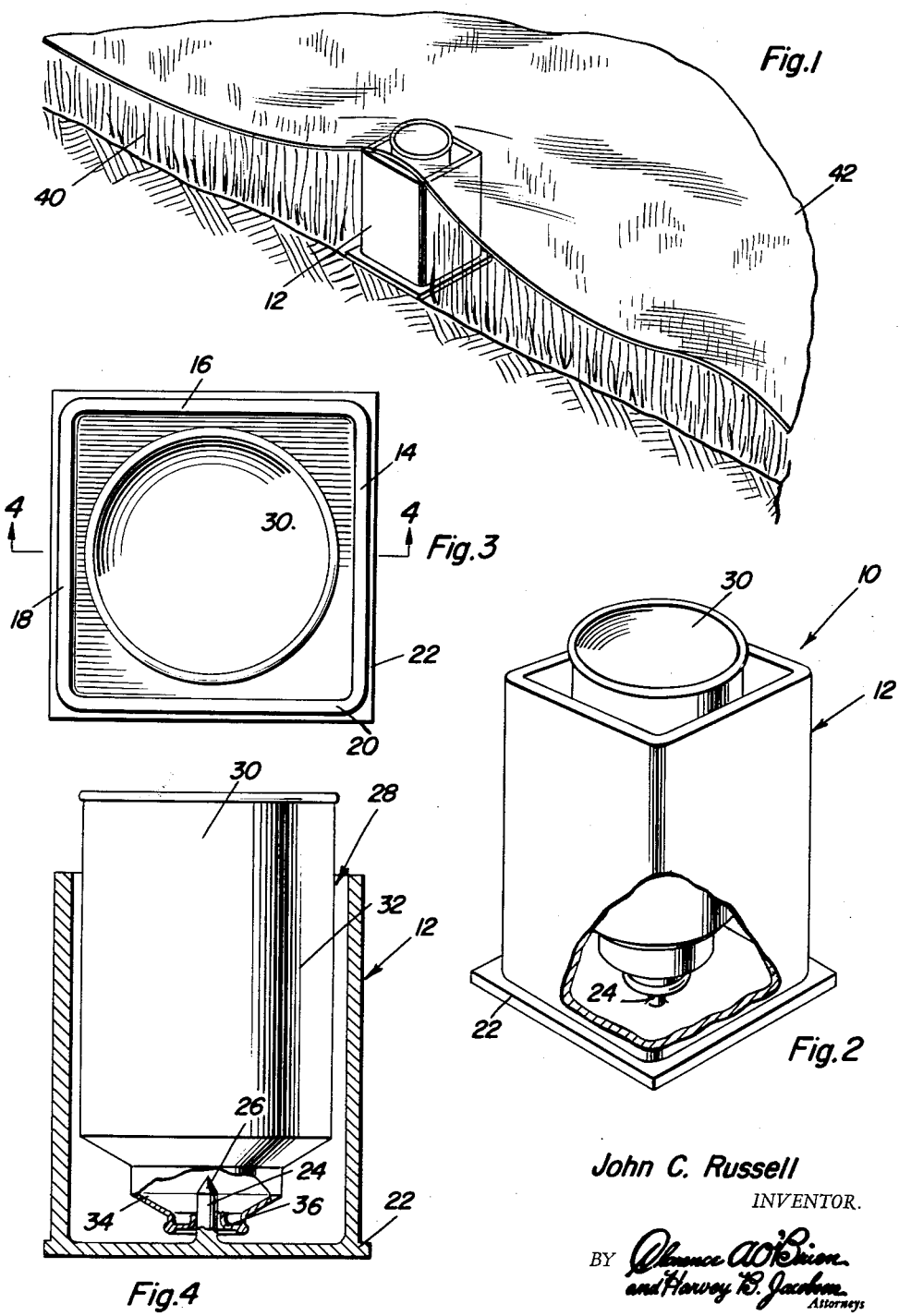
John C. Russell
INVENTOR.

United States Patent Office 2,984,939
Patented May 23, 1961

2,984,939
METHOD AND APPARATUS FOR DISPENSING LIQUID FROM PRESSURE CANS

John C. Russell, P.O. Box 7801, Orlando, Fla.

Filed Apr. 22, 1959, Ser. No. 808,113

4 Claims. (Cl. 47—58)

This invention relates generally to liquid dispensing apparatus and more particularly to a method and apparatus for dispensing liquid from pressure cans.

Methyl bromide or combinations of 98% methyl bromide and 2% chloropicrin is being presently marketed by several companies in one pound cans under pressure. The chemical liquid is used for soil sterilization (weed seed, soil diseases and nematode control) and because of the high volatility of the chemical liquid, it must be applied beneath a plastic sheeting that covers the ground which is to be fumigated or treated. The cover or sheeting retains the methyl bromide fumes long enough to properly sterilize the desired area. The prior art discloses applicators which are presently in use and include devices as disclosed in Patent No. 2,356,440 issued on August 22, 1944. As will be apparent, to utilize the devices of the prior art, the pressure cans are punctured near the bottom by clamping a collar punch thereon. The chemical liquid then escapes through a tube to a pan beneath the cover or sheeting which is anchored in sealed relationship over the ground area to be treated. It has been found that the utilization of the prior art devices are disadvantageous for numerous reasons. Initially, the cost of the apparatus is comparatively high. Further, it is difficult to achieve a proper seal at the point where the tube goes under the plastic sheeting. More important, however, is the fact that the can of pressurized methyl bromide and the applicator must be held by the operator and quite frequently a tube breaks or there is a leak around the puncture which may result in serious burns and dangerous exposure to the person during the application.

In view of the significant disadvantages, the applicant has herein developed a method and apparatus which substantially eliminates the undesirable attributes of former methods.

Accordingly, it is the principal object of this invention to provide a novel method and apparatus for dispensing chemical liquids from pressure cans to apply or distribute the liquid to a desired ground area.

It is a further object of this invention to provide a novel method and apparatus for treating a ground area wherein sheeting is anchored in sealed relationship over the area and the pressure can is pierced beneath the sheeting so as to expose the liquid chemical for evaporation over the ground area.

It is a still further object of this invention to provide a novel method and apparatus for applying or distributing liquid chemicals from pressure cans over a ground area which is less expensive and safer than former methods known to the prior art.

In accordance with the above stated objects, below is particularly described the novel method and apparatus contemplated. Initially, an applicator including a housing having an open top portion and an upstanding piercing element is provided. The pressurized can is supported on the piercing element or spike in an inverted position. The pressurized can and applicator, are placed beneath the sheeting which encloses a volume including the area to be treated. With the volume entirely isolated, the operator may force the pressurized can down upon the piercing element or spike to allow the liquid contents to flow from the can into the open housing. The liquid which flows into the housing bowl beneath and around the can may then quickly evaporate into the air or volume enclosed by the plastic sheeting. It will therefore be apparent that any danger to the operator has been eliminated and the application has been carried out efficiently at a minimum cost.

Other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view illustrating the apparatus and method of utilizing the same to treat a ground area;

Figure 2 is a perspective view partially cut-away, more particularly illustrating the apparatus and method of piercing the pressurized can;

Figure 3 is a bottom elevational view of the apparatus;

Figure 4 is a sectional view taken substantially along the plane 4—4 of Figure 3 showing the cooperation between the applicator and the pressurized can.

With continuing reference to the drawings, numeral 10 generally represents the applicator apparatus comprising a portion of this invention and including a housing 12 having side portions 14, 16, 18 and 20 which perpendicularly and upwardly extend from a base portion 22. The base portion 22 has a piercing element or spike 24 fixed at the center thereof. The spike 24 terminates in a sharply pointed end 26. It will be appreciated that the piercing element or spike 24 may be fixed in any appropriate manner to the base 22. The top portion of the housing 12 is generally designated at 28 and is open to receive a pressure can 30 therethrough. The pressure can 30 has a body portion 32 and a neck portion 34. A rupturable pressure cap 36 is adapted to be easily pierced by the spike 24 to allow the liquid contents of the pressure can 30 to flow into the housing 12 onto the base 22 between the side portions 14, 16, 18 and 20.

In utilizing the above described apparatus, the housing 12 is placed on the ground 40. The ground 40 is to be treated by the liquid contents of the can 30. A plastic sheet 42 is spread over the ground area 40 and the edges of the sheeting is anchored so that a proper seal is formed between the sheeting and the soil. It is to be appreciated that the can 30 is disposed in an inverted manner on the spike or piercing implement 24 prior to anchoring the sheeting 42. When initially placing the pressurized can 30 on the spike or piercing element 24, the can should be easily pressed on the spike but sufficient pressure should not be applied so that the pressure cap 36 will be ruptured. Subsequent to completely sealing the sheeting about the areas to be treated, the operator presses firmly on the bottom of the can 30 containing the liquid chemical. Though the liquid chemical may easily burn the operator if the sheeting 42 was not between the can and the operator, it will be apparent that he is now entirely protected from the hazards presented by the liquid chemical (it is contemplated that methyl bromide be utilized). As the can 30 is pressed down on the spike or piercing element 24, the pressure cap 36 is easily ruptured so as to release the liquid from the pressure can 30 onto the base 22 between the side portions. The liquid chemical, for example methyl bromide, then quickly evaporates into the volume or air beneath the plastic sheeting.

From the foregoing, it will be fully appreciated that a novel method and apparatus has been disclosed for safely, efficiently, and inexpensively distributing the chemical liquid over a ground area to be treated.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. A method of distributing the liquid contents of a pressurized can over a desired area comprising isolating a volume enclosing said area and said pressurized can by anchoring a sheet in sealed relationship with the ground around said area, providing an upstanding piercing implement beneath said sheet, forcing said can against said piercing member from a location remote from said volume whereby said liquid contents becomes exposed to said volume, and allowing said liquid contents to evaporate into said volume for distribution over said area.

2. A method of distributing the liquid contents of a pressurized can over a desired area of uneven terrain for sterilizing said terrain comprising isolating a volume enclosing said area and said pressurized can by anchoring a flexible sheet in sealed relationship with the ground around said area, providing an upstanding piercing implement beneath said sheet, forcing said flexible sheet against said can and said can against said piercing implement from a location remote from said volume whereby said liquid contents becomes exposed to said volume, and allowing said liquid contents to evaporate into said volume for distribution over said area.

3. Applicator apparatus for distributing the contents of a pressurized liquid container over an area of terrain comprising a flexible sheet, means sealing said sheet to said terrain enclosing a volume therein including said area, an upstanding piercing element disposed in said volume, said container received beneath said sheet engageable with said piercing element whereby the contents of said container may be dispensed therefrom.

4. Applicator apparatus for distributing the contents of a pressurized liquid container over an area of terrain comprising a flexible sheet, means sealing said sheet to said terrain enclosing a volume therein including said area, an upstanding piercing element disposed in said volume, said container received beneath said sheet engageable with said piercing element whereby the contents of said container may be dispensed therefrom, a housing including a base and side portions extending upwardly therefrom, an open top portion on said housing adapted to receive said container therethrough, said upstanding piercing element supported on said base in said housing extending toward said open top portion.

References Cited in the file of this patent

UNITED STATES PATENTS

| | | |
|---|---|---|
| 222,575 | Cook | Dec. 16, 1879 |
| 1,557,861 | Moreida | Oct. 20, 1925 |
| 1,983,546 | Johnson | Dec. 11, 1934 |
| 2,509,627 | Bickerton | May 30, 1950 |

FOREIGN PATENTS

| | | |
|---|---|---|
| 526,837 | Belgium | Mar. 15, 1954 |
| 614,406 | France | Sept. 18, 1926 |

OTHER REFERENCES

Publication, Washington (D. C.) Post and Times-Herald (Newspaper), Sunday, April 24, 1955, page C–15, article "Soil Fumigation Calls For The Greatest Care," by J. H. Beattie.